DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 6

T948,007

ALKALI METAL COMPOUNDS AS POLYESTERIFICATION CATALYSTS FOR UNSATURATED POLYESTERS BASED ON 2,2,4-TRIMETHYL-1,3-PENTANEDIOL

John R. Dombroski, Rte. 13, 5608 Cheyenne Trail, Kingsport, Tenn. 37664

Filed Oct. 31, 1975, Ser. No. 627,646
Int. Cl. C08g *63/52*
U.S. Cl. 260—75 UA
No Drawing. 8 Pages Specification

This invention is concerned with a class of materials which is useful for improving the polyesterification process of 2,2,4-trimethyl-1,3-pentanediol. In particular, this invention relates to the use of Group IA alkali metal acetates, carbonates, hydroxides, oxalates, alkoxides and soluble oxides as polyesterification catalysts and co-catalysts for the preparation of unsaturated polyester based on 2,2,4-trimethyl-1,3-pentanediol and blends of 2,2,4-trimethyl-1,3-pentanediol and other glycols. It is shown in this invention that the alkali metal compounds enable the preparation of unsaturated polyesters based on 2,2,4-trimethyl-1,3-pentanediol with (1) a shorter polyesterification time and (2) reduces the loss of 2,2,4-trimethyl-1,3-pentanediol due to undesirable side reactions.